United States Patent
Rhee et al.

(10) Patent No.: US 8,598,752 B2
(45) Date of Patent: Dec. 3, 2013

(54) MOTOR

(75) Inventors: Dong Woo Rhee, Gyunggi-do (KR); Jae Yoon Kim, Gyunggi-do (KR); Jun Kyu Park, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 278 days.

(21) Appl. No.: 12/923,095

(22) Filed: Sep. 1, 2010

(65) Prior Publication Data

US 2011/0140583 A1    Jun. 16, 2011

(30) Foreign Application Priority Data

Dec. 11, 2009 (KR) .................. 10-2009-0123272

(51) Int. Cl.
*H02K 11/00* (2006.01)
(52) U.S. Cl.
USPC ..................................... 310/68 B; 310/67 R
(58) Field of Classification Search
USPC ............... 310/67 R, 68 B; 360/99.08, 71; 369/44.32, 244.1
See application file for complete search history.

(56) References Cited

U.S. PATENT DOCUMENTS

| 7,126,786 B1 * | 10/2006 | Nayak et al. ............... 360/99.08 |
| 7,247,961 B2 | 7/2007 | Nayak et al. |
| 8,144,553 B2 * | 3/2012 | Yoo et al. ................... 369/44.32 |
| 2004/0129869 A1 * | 7/2004 | Stridsberg ................ 250/231.13 |
| 2006/0022621 A1 * | 2/2006 | Mine et al. ..................... 318/66 |
| 2006/0033388 A1 * | 2/2006 | Nayak et al. ................. 310/67 R |
| 2006/0202574 A1 * | 9/2006 | Nayak et al. ................. 310/68 B |
| 2009/0262449 A1 * | 10/2009 | Yoo et al. ........................ 360/71 |

FOREIGN PATENT DOCUMENTS

| JP | 2006-50727 | 2/2006 |
| KR | 1998-045558 | 9/1998 |
| KR | 10-2007-0018207 | 2/2007 |

OTHER PUBLICATIONS

Korean Office Action issued May 26, 2011 in corresponding Korean Patent Application 10-2009-0123272.

* cited by examiner

*Primary Examiner* — Tran Nguyen

(57) ABSTRACT

Disclosed is a motor. The motor includes a rotor case, a ring member mounted on the rotor case and including an encoder on a bottom surface thereof extending outside of the rotor case, and an encoder sensor detecting speed information of the rotor case from the encoder such that the rotor case rotates at low speeds enabling a LightScribe operation.

6 Claims, 5 Drawing Sheets

MOTOR

CROSS-REFERENCE TO RELATED APPLICATIONS

This application claims the priority of Korean Patent Application No. 10-2009-0123272 filed on Dec. 11, 2009, in the Korean Intellectual Property Office, the disclosure of which is incorporated herein by reference.

BACKGROUND OF THE INVENTION

1. Field of the Invention

The present invention relates to a motor, and more particularly, to a motor capable of having a control function for low-speed rotation by including an encoder on the bottom surface of a ring member mounted on a rotor case, and an encoder sensor located corresponding to the encoder.

2. Description of the Related Art

In general, a spindle motor installed inside an optical disc drive rotates a disc so that an optical pickup mechanism can read data written to the disc.

Recently, an optical disc drive equipped with a LightScribe function has been increasingly released onto the market. Here, the LightScribe function allows users to print letters (characters) or images freely on the upper side of a disc such as a DVD, a CD or the like.

According to the related art, only LightScribe discs that support the LightScribe function by having a printed encoder generating an FG pulse for low-speed control are able to be used in order to implement the LightScribe function. Here, typical discs for recording cannot be used in realizing the LightScribe function.

That is, in order to use the LightScribe function, a spindle motor needs to rotate at a low speed of 40 rpm to 300 rpm or less. Thus, an encoder generating a separate FG pulse is printed on the side of a disc, since the FG pulse of the spindle motor itself, cannot be used for the LightScribe function.

However, the use of such LightScribe discs has limitations in that the discs are costly and are not easy to buy.

In addition, since LightScribe printing is performed on the opposite side to the read/write-side of a disc, the LightScribe disc is repetitively taken out from and put back into a chucking device. This may damage an encoder printed on the LightScribe disc.

Further, the encoder, when printed on a disc in a non-uniform manner, fails to perform precise low-speed control and impairs printing quality.

SUMMARY OF THE INVENTION

An aspect of the present invention provides a motor capable of having a control function for low-speed rotation (hereinafter "low-speed rotation control") by including an encoder on the bottom surface of a ring member mounted on a rotor case, and an encoder sensor located corresponding to the encoder.

According to an aspect of the present invention, there is provided a motor including: a rotor case; a ring member mounted on the rotor case and including an encoder on a bottom surface thereof extending outside of the rotor case; and an encoder sensor detecting speed information of the rotor case from the encoder such that the rotor case rotates at low speeds enabling a LightScribe operation.

The ring member may be fixed to a chucking device on which a disc is mounted.

The encoder may be inkjet-printed on the bottom surface of the ring member.

The encoder may be provided as an adhesive film and bonded with the bottom surface of the ring member.

The encoder may be formed uniformly on the bottom surface of the ring member.

The ring member may include, on a top surface thereof, a disc mounting portion on which a disc is mounted.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
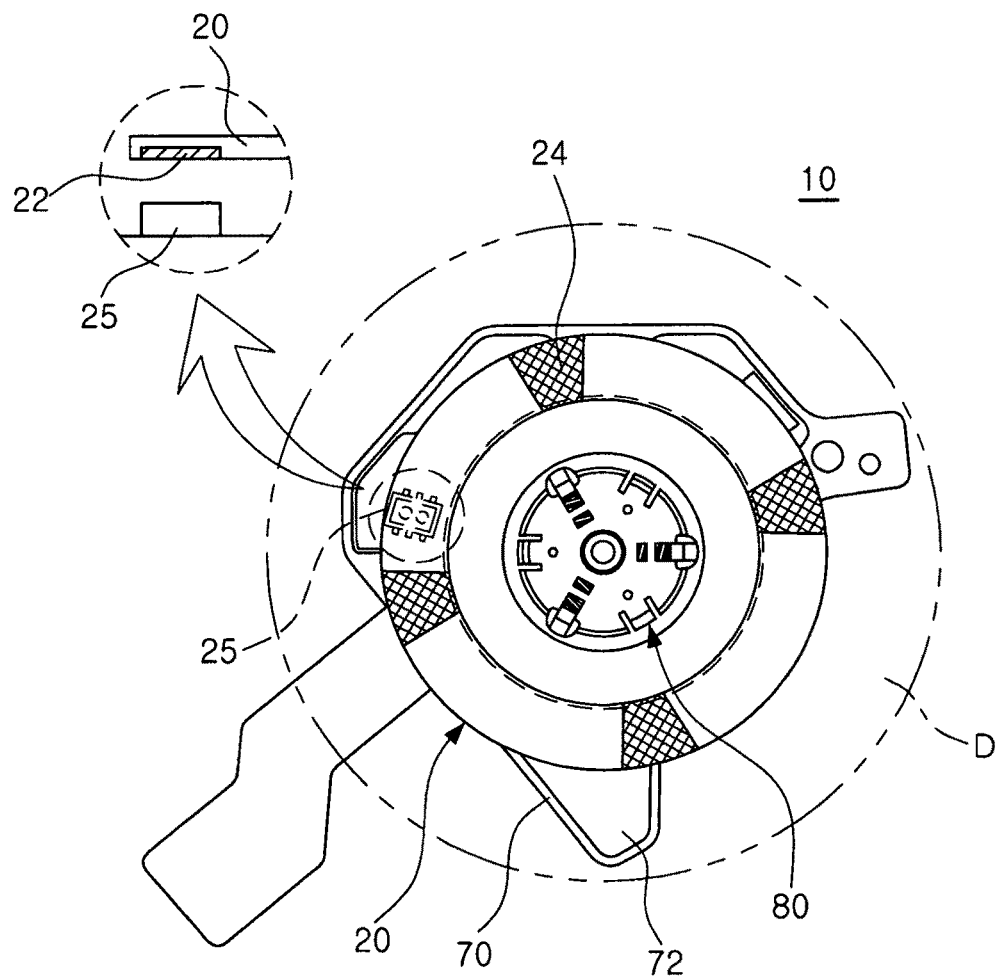
FIG. 1 is a schematic plan view illustrating a motor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

The same or equivalent elements are referred to by the same reference numerals throughout the specification.

Figure 2:
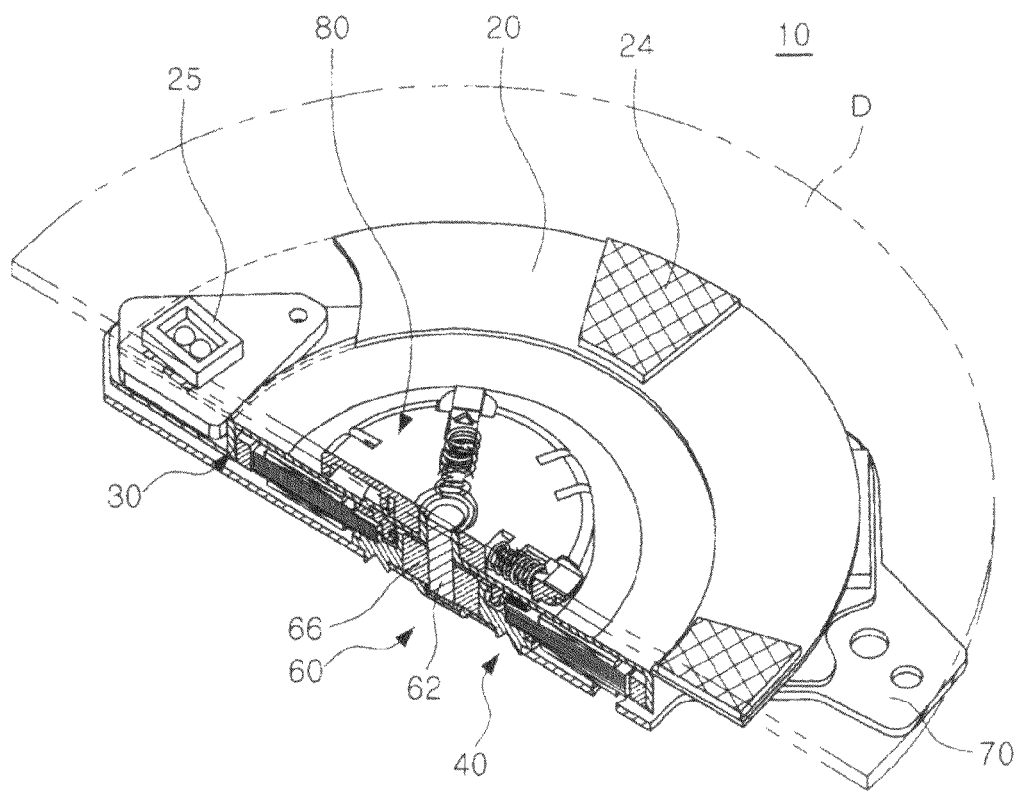
FIG. 2 is a schematic perspective view illustrating a motor according to an exemplary embodiment of the present invention.
Figure 3:
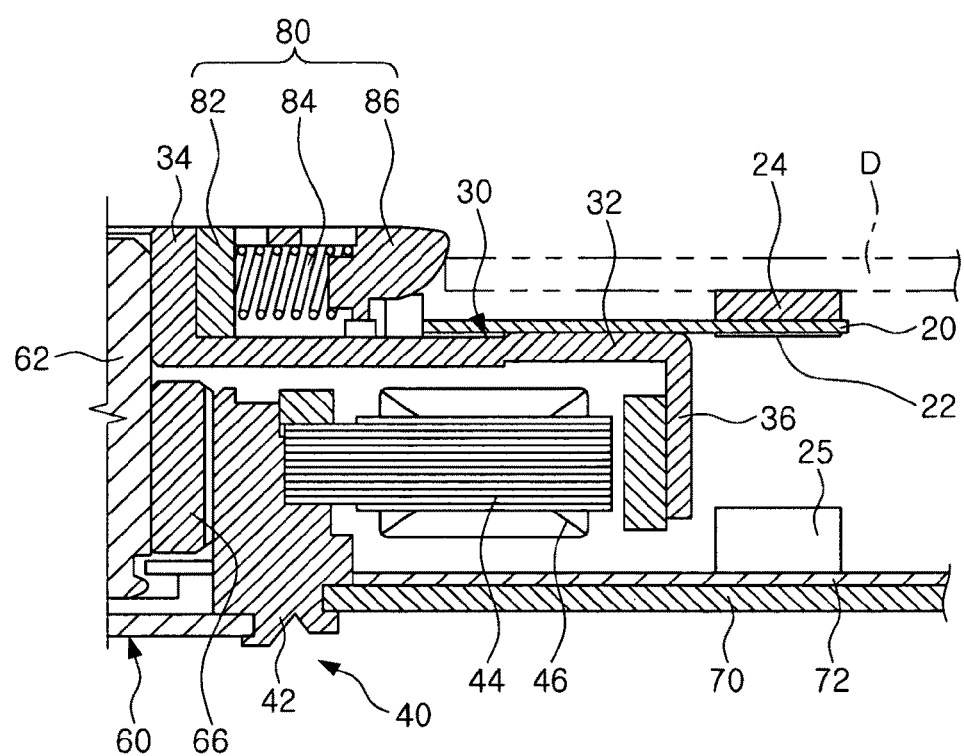
FIG. 3 is a cross-sectional view illustrating a motor according to an exemplary embodiment of the present invention.
Figure 4:
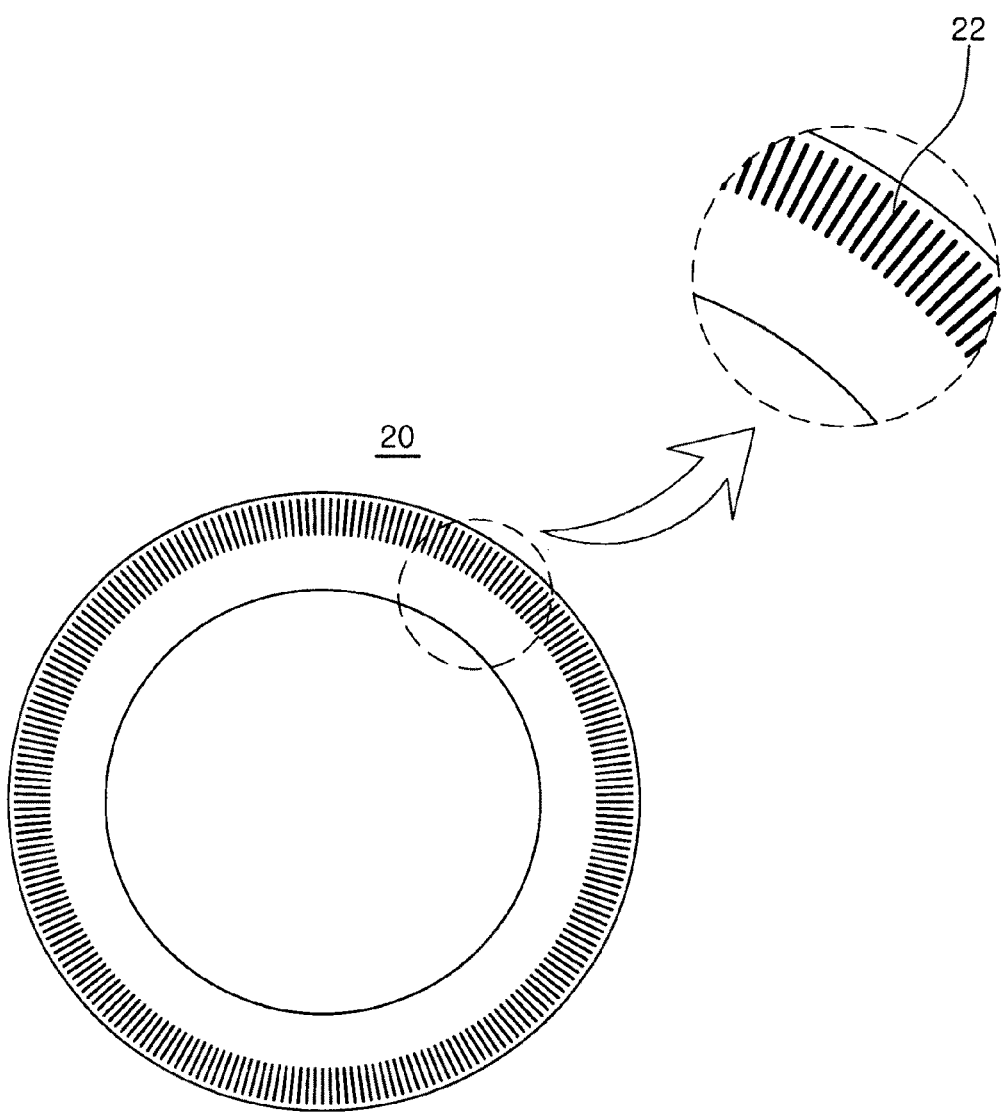
FIG. 4 is a schematic view illustrating the bottom of a ring member according to an exemplary embodiment of the present invention.

FIG. 1 is a schematic plan view illustrating a motor according to an exemplary embodiment of the present invention. FIG. 2 is a schematic perspective view illustrating a motor according to an exemplary embodiment of the present invention. FIG. 3 is a cross-sectional view illustrating a motor according to an exemplary embodiment of the present invention. FIG. 4 is a schematic view illustrating the bottom of a ring member according to an exemplary embodiment of the present invention.

Referring to FIGS. 1 through 4, a motor 10, according to an exemplary embodiment of the present invention, may include a rotor case 32, a ring member 20 and an encoder sensor 25.

As for the internal construction of the motor 10, the motor 10 may include a base plate 70, a rotor 30, a stator 40, a bearing assembly 60, and a chucking device 80.

The base plate 70 serves as a support that supports the stator 40. A flexible circuit board 72 may be formed on the base plate 70. The flexible printed circuit board 72 may be provided with a circuit pattern applying power to the motor 10.

The encoder sensor 25 is a data detector that receives information regarding the rotation of a disc D. Notably, the encoder sensor 25 may detect speed information of the rotor case 32 from an encoder formed on the ring member 20.

The rotor 30 includes a rotor case 32 having a cup shape. The rotor case 32 includes a ring-shaped magnet 35 provided on the inner circumferential portion of the rotor case 32 and corresponding to a coil 46 of the stator 40. The magnet 35 is a permanent magnet that generates a predetermined level of magnetic force as N poles and S poles are alternately magnetized in a circumferential direction.

The rotor case 32 includes a rotor hub 34 press-fitted to a shaft 62, and a magnet coupling portion 36 having an inner surface on which the ring-shaped magnet 35 is disposed.

The rotor hub 34 is bent in an axial direction along the upper portion of the shaft 62 in order to maintain an unmating force with the shaft 62. The chucking device 80 on which a disc D is mounted is coupled with the outer surface of the rotor hub 34.

The stator 40 includes a support portion 42 supported from the outside of a sleeve 66, a plurality of cores 44 fixed to the support portion 42, and a winding coil 46 wound around the cores 44.

The magnet 35, provided on the inner surface of the magnet coupling portion 36, opposes the winding coil 46. The rotor 30 is rotated by the electromagnetic interaction between the magnet 35 and the winding coil 46.

Further, the bearing assembly 60 is disposed inside of the support portion 42 of the stator 40, and includes the shaft 62 supporting the rotation of the rotor 30, and the sleeve 66 in which the shaft 60 is rotatably installed.

Terms regarding directions are defined as follows: the axial direction refers to a vertical direction with reference to the shaft 62 in FIG. 1, and outer and inner diameter directions refer to a direction toward the outer edge of the rotor 20 from the shaft 62, and a direction toward the center of shaft 62 from the outer edge of the rotor 30, respectively.

The chucking device 80 is coupled and fixed to one end portion of the rotor hub 34, and allows for the detachable mounting of a disc thereon. The chucking device 80 includes a chuck base 82, a spring 84, and a chuck chip 86.

A center hole is formed in the center of the chuck base 82. The one end portion of the rotor hub 34 may be inserted into the center hole and coupled with the motor 10.

The chuck chip 86 is received in the chuck base 82, and may protrude toward the outside of the chuck base 82. The spring 84 may be provided to elastically support the chuck chip 82 in an outward direction of the chuck base 82, thereby allowing the chuck chip 82 to protrude to the outside of the chuck base 82.

The ring member 20 may be mounted on the top surface of the rotor case 32 by being inserted below the chucking device 80 in the axial direction. That is, the ring member 20 may be fixed to the chucking device 80.

A disc D may be mounted on the top surface of the ring member 20. A disc mounting portion 24 may be provided on the top surface of the ring member 20 such that the disc D can be mounted stably thereon.

An encoder 22 may be formed on a portion of the bottom surface of the rotor case 32 extending outside of the rotor case 32 in the outer diameter direction.

The encoder 22 is formed by alternating reflective and non-reflective patterns on the bottom surface of the ring member 20 along the circumference of the ring member 20, such that the encoder 22 reflects light coming out of the encoder sensor 25 to allow the encoder sensor 25 to receive the reflected light.

The encoder sensor 25 absorbs light reflected from the encoder 22 to thereby obtain a pulse signal. The pulse signal is transferred to a controller (not shown) that controls a speed of the motor 10, and the controller performs rotation control for a low speed of the motor 10.

Figure 5A:
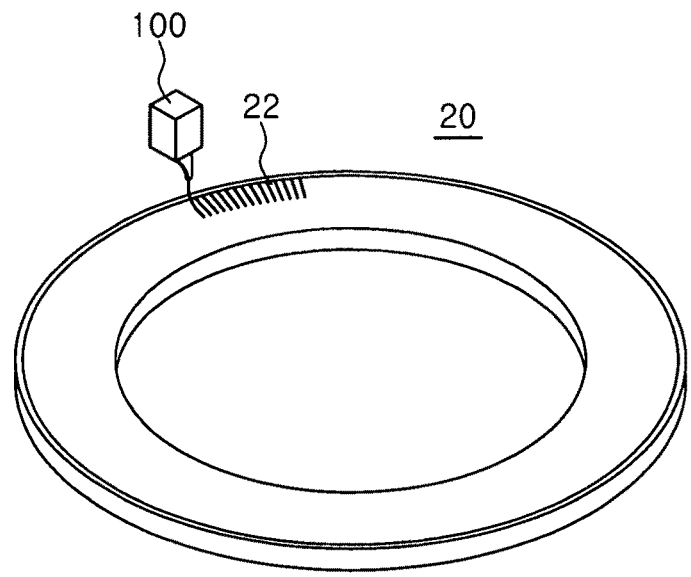
FIGS. 5A and 5B are schematic views illustrating how an encoder is formed on the bottom surface of a ring member according to an exemplary embodiment of the present invention.
Figure 5B:
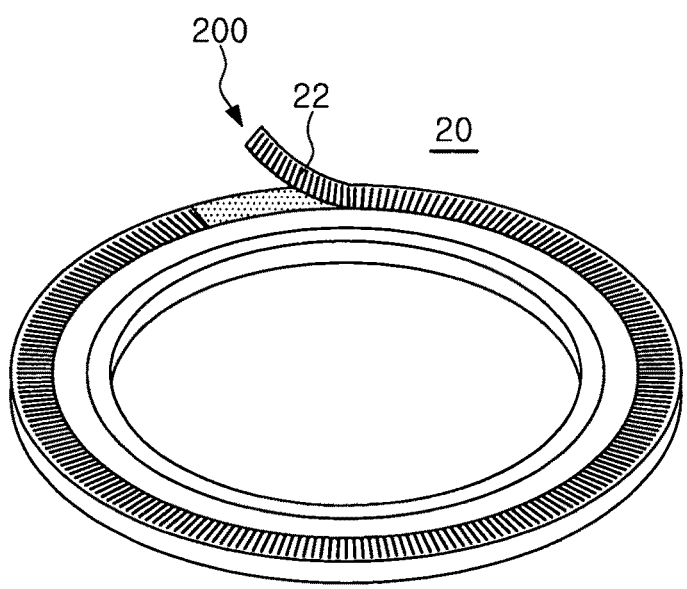

FIGS. 5A and 5B are schematic views illustrating how the encoder 22 is formed on the bottom surface of the ring member 20 according to an exemplary embodiment of the present invention.

From FIGS. 5A and 5B, it can be seen how the encoder 22 is formed on the bottom surface of the ring member 20.

Referring to FIG. 5A, the encoder 22 is inkjet-printed on the bottom surface of the ring member 20 by using an inkjet printer 100. Referring to FIG. 5B, the encoder 22 is provided in the form of an adhesive film 200 and is bonded with the bottom surface of the ring member 20.

The motor, according to the present invention, eliminates the need for LightScribe discs, and is capable of low-speed control required for the LightScribe function even when typical discs for recording are used.

Also, the encoder, formed on the ring member, is not damaged even if a disc is repetitively taken out from and put back into the chucking device.

Since the encoder is printed uniformly, precise low-speed control is ensured, and printing quality is improved.

As set forth above, according to the motor according to exemplary embodiments of the invention, LightScribe discs are not necessary, and low-speed control required to implement the LightScribe function can be performed even when typical discs for recording are used.

Since the encoder is formed on the ring member, the encoder is prevented from being damaged even if a disc is repetitively placed in and out of the chucking device.

The uniform encoder print state allows for precise low-speed control, as well as the enhancement of printing quality.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
   a rotor case;
   a ring member mounted on the rotor case and including an encoder on a bottom surface thereof extending outside of the rotor case; and
   an encoder sensor configured to detect speed information of the rotor case from the encoder such that the rotor case rotates at low speeds enabling a LightScribe operation without a LightScribe disc provided in the motor.

2. The motor of claim 1, wherein the ring member is fixed to a chucking device on which a disc is mounted.

3. The motor of claim 1, wherein the encoder is inkjet-printed on the bottom surface of the ring member.

4. The motor of claim 1, wherein the encoder is provided as an adhesive film and bonded with the bottom surface of the ring member.

5. The motor of claim 1, wherein the encoder is formed uniformly on the bottom surface of the ring member.

6. The motor of claim 1, wherein the ring member includes a disc mounting portion on a top surface thereof, the disc being mounted on the disc mounting portion.

* * * * *